Patented Nov. 17, 1931

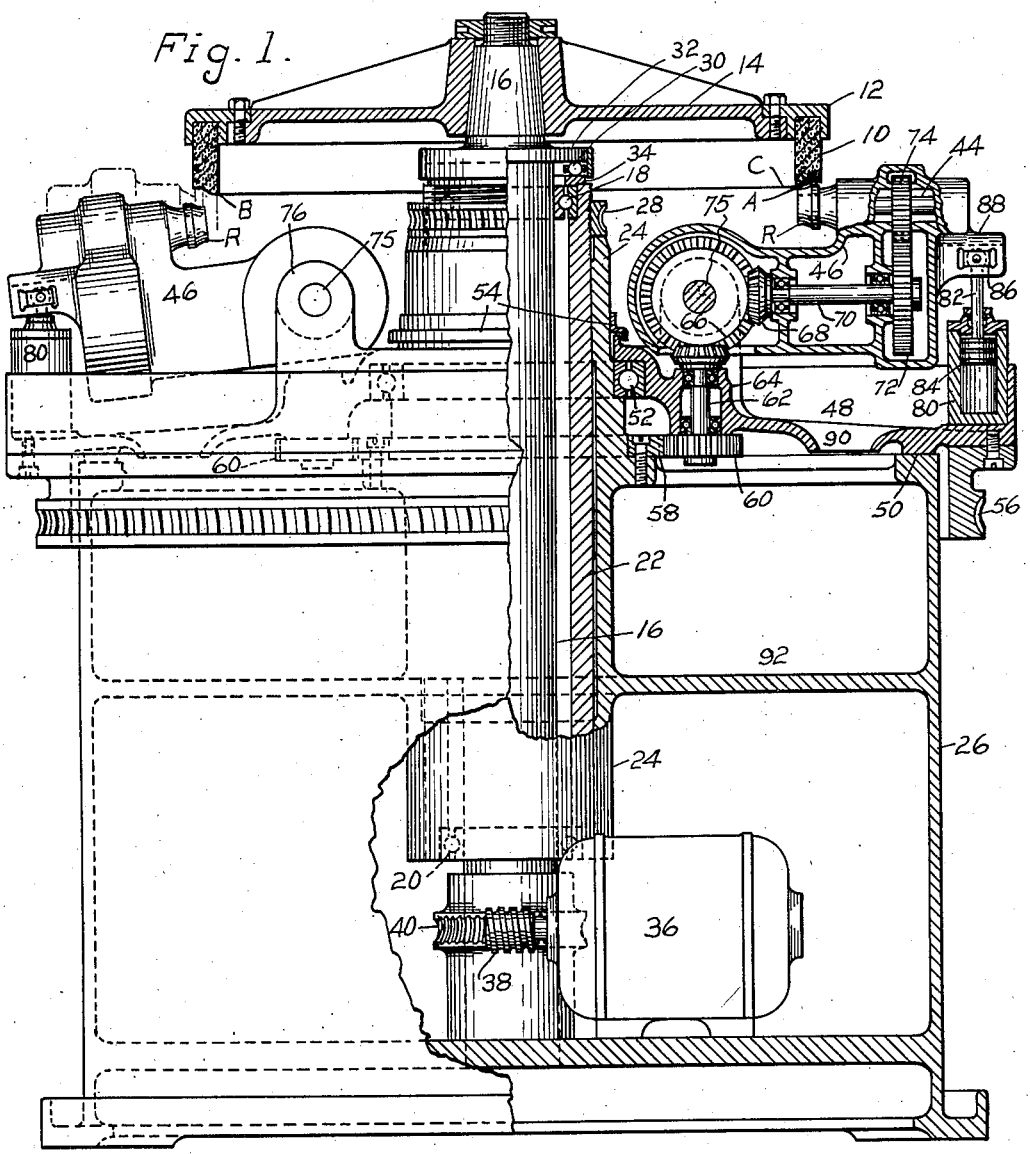

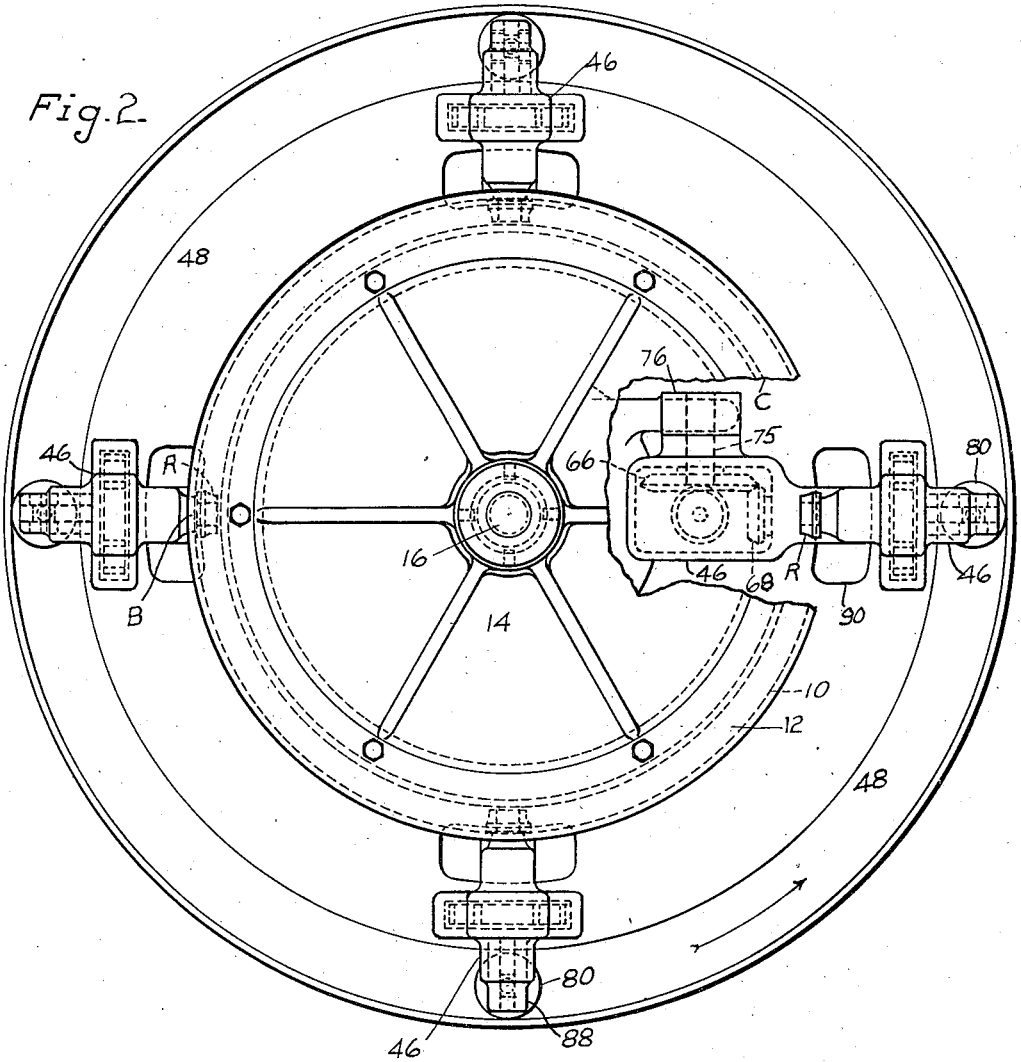

1,832,190

UNITED STATES PATENT OFFICE

JOHN A. DOANE, OF WEST HARTFORD, CONNECTICUT, ASSIGNOR TO THE NEW DEPARTURE MANUFACTURING COMPANY, OF BRISTOL, CONNECTICUT, A CORPORATION OF CONNECTICUT

CUTTING MACHINE

Application filed November 25, 1927. Serial No. 235,558.

This invention relates to cutting machines and comprises all the features of novelty herein disclosed, by way of example, in connection with a machine for grinding transversely curved raceways on antifriction bearing cones.

In the usual method of grinding a transversely curved raceway on a cone, the practice is to place the cone in a rotating chuck of an oscillating grinding machine, either the grinding wheel or the chuck being oscillated to generate a transversely curved raceway. The high speed at which a small grinding wheel must be rotated gives rise to difficulties in supporting the wheel spindle without undue deflection or vibration and the wheel soon wears down. Difficulties in the way of producing the precise shaping and sizing necessary for race rings also arise because of play or lack of regular angular movement in the oscillating mechanism of the wheel or chuck. Such machines have elaborate feeding mechanism for the wheel or the work and they grind but one piece at a time.

An object of the invention is to provide mechanism for cutting shaped surfaces on cones or the like in a manner to avoid the above mentioned and other difficulties. Another object is to provide an improved machine for cutting shaped surfaces on a number of articles at a time. Another object is to provide a cutting machine having simple and effective provision for relative feed movement between the wheel and the work. Still another object is to provide an improved machine for efficiently producing accurately formed surfaces on circular articles. To these ends and to improve generally upon machines of this general character, the invention also consists in the various matters herein described and claimed.

In the drawings Figure 1 is a side elevation of the machine, some parts being broken away and others being in section.

Fig. 2 is a plan view, partly broken away.

The numeral 10 indicates a cutting tool, preferably a large grinding wheel in the form of a ring having its lower edge formed to a shape corresponding to the transverse shape desired in the finished article. The grinding wheel is carried by a flanged ring 12 fastened to a disc 14 whose hub is fastened to the upper end of a rugged spindle 16. The spindle preferably has a slight inclination with respect to other elements as will appear and rotates on an accurate axis provided by antifriction bearings 18 and 20 in a sleeve 22 which is vertically adjustable in a tubular portion 24 of a main frame 26. The sleeve is threaded to receive a nut 28 by which it is adjusted endwise as for work size and wheel wear, the nut resting on the top of the tubular portion 24. A thrust bearing 30, interposed between a flange or collar 32 of the spindle and an annular race ring 34 on the sleeve, supports the spindle and grinding wheel. The spindle is rotated by an electric motor 36 having a worm 38 engaging a worm wheel 40 fixed on the lower end of the spindle. To get the requisite surface speed of the abrasive surface, the large wheel need not be rotated at a speed inviting vibration and the mass of the wheel and its sturdy spindle provide momentum which is conducive to smooth and uniform running and the production of a smooth ground surface. When the articles to be ground are cones R as illustrated, they are rotated on their axes while being carried bodily in a circular path under the wheel. Each article is secured to a work holder and, when the article is a cone or race ring, it is chucked in any suitable way on a work spindle 44 journalled for rotation in a housing or support 46 pivotally carried by a rotary carrier 48. Cooperating flat finished faces at 50 afford a firm bearing between the rotary carrier and the main frame. The carrier turns on an accurate axis afforded by a ball bearing 52 from which grit is excluded by a shield 54. The carrier is turned slowly in any convenient way as by an annular worm gear 56 fixed to the carrier. The carrier can be turned in either direction but preferably in a direction tending to supplement the speed of the grinding wheel.

The rotary movement of the carrier 48 is utilized to effect the rotation of the work spindles. A ring gear 58 is fixed to the frame and meshes with a series of gears 60, the gears 60 corresponding in number to the number of work spindles. Each gear 60 is carried by a vertical stub shaft 62 journalled on ball bearings in a boss or housing 64 and carrying a bevel pinion meshing with a bevel gear 66 in the housing 46. The bevel gear 66 drives a bevel pinion 68 on a shaft 70 journalled in ball bearings in the housing and having a gear 72 driving a gear 74 on the work spindle 44. The bevel gear 66 turns on a shaft 75 which also acts as a pivot for the housing, the shaft extending into a bearing opening in a lug 76 on the carrier 48. The housing 46 can thus be swung down around its pivot without interference with the driving connection to the spindle. When grinding, the housing is supported in the position indicated by broken lines at the left of Fig. 1 but can be swung down to the position indicated by full lines to load or unload the work spindle. Any suitable mechanism may be used to swing the housing. In the illustrated construction, a cylinder 80 is mounted on the rotary carrier and a piston rod 82 extends upwardly from a piston 84 and is pivotally connected to a block 86 slidable in an opening of a lug 88 on the housing. Pressure fluid admitted to the cylinder will hold the work spindle in grinding position or lower the spindle for loading. The upper side of the rotary carrier is formed as a pan to direct cooling compound through openings 90 into an annular tank 92 formed in the machine frame to collect the fluid for future use.

The annular cutting edge of the grinding wheel lies in a plane which is inclined very slightly with respect to the path of the carrier and to the plane in which the axes of the work spindles move while in a grinding position. In other words the axis of the wheel spindle 16 and the axis of the rotary carrier 48 are nearly but not quite in coincidence, the one axis intersecting the other at a very small angle approximately at the plane of the cutting edge. Hence, as the article is carried around approximately a half revolution from the point where it first engages the wheel, its axis will gradually approach the active face of the grinding wheel or other tool. This serves as a feed to enable the wheel to continue grinding as the surface of the article is cut away. The letter A represents the point where the abrading surface is highest with respect to a loaded work spindle and the letter B represents the point where it is lowest. The preliminary set-up is such that an article on the spindle at A, even though the spindle be elevated, will not quite meet the wheel but, depending on its size, it will first meet the wheel at some point C a little beyond the point A. Grinding will continue from this point to the point B unless the work spindle be previously lowered. The distance of the work spindle from the abrasive surface at this point can be definitely established and so control the finished size of the work. If, however, due to inaccurate setting, the work be ground to size before reaching the point B, the gauge will cause the spindle to be lowered before further grinding can occur. The work can be removed at any convenient station adjacent to or beyond the point B and a new piece placed on the work spindle at any point thereafter, the loaded spindle being raised prior to its reaching the grinding point C. Hence the work is in contact with the wheel for something less than half a revolution, the departure from 180° contact allowing for small variations in size of the unground work.

I claim:

1. In a machine for grinding a transversely curved surface on a piece of work, a ring shaped grinding wheel having an annular cutting edge provided with the transversely curved contour desired for the work-piece, means for rotating the wheel around an axis, a carrier rotatable in a circular path slightly inclined to that of the cutting edge of the wheel, and means for supporting the work-piece on the carrier in a position to carry its wheel engaging edge in an annular path directly opposite to the annular cutting edge of the wheel, said path also lying in a plane slightly inclined to the wheel and intersecting its contoured edge.

2. In a machine for grinding a transversely curved surface on a piece of work, a ring shaped grinding wheel having an annular cutting edge provided with the transversely curved contour desired for the work-piece, means for rotating the wheel around an axis, a carrier rotatable in a circular path slightly inclined to that of the cutting edge of the wheel, a series of work holders radially mounted on the carrier, means for rotating the work-pieces around their axes, said holders supporting the work-pieces in position to carry their wheel engaging edges in an annular path directly opposite to the annular cutting edge of the wheel, said path also lying in a plane slightly inclined to the wheel and intersecting its contoured edge; substantially as described.

3. In a machine for grinding transversely curved surfaces on a piece of work, a ring shaped grinding wheel having an annular cutting edge provided with the transversely curved contour desired for the work-piece, means for rotating the wheel around an axis, a carrier rotatable around an axis in a path at a small angle to the cutting edge of the wheel, and means for supporting the work-piece on the carrier so that its wheel engaging edge travels in a plane at a small angle to the cutting edge of the wheel and intersecting its contoured edge to provide for relative feeding movement between the wheel and the work in a direction to always maintain the work at substantially the same distance from the axis of the wheel; substantially as described.

4. In a machine for grinding a transversely curved surface on a piece of work, a ring shaped grinding wheel having an annular cutting edge provided with the transversely curved contour desired for the work-piece, a carrier rotatable around an axis, means for rotating the wheel around an axis arranged at a small angle to the carrier axis to carry the cutting edge in a plane inclined with respect to the path of the carrier, a work support mounted on the carrier, and a swinging support for the work holder to provide for movement of the work towards or from the annular cutting edge; substantially as described.

5. In a machine for grinding a transversely curved surface on a piece of work, a ring shaped grinding wheel having an annular cutting edge provided with the transversely curved contour desired for the work-piece, a carrier rotatable around an axis, means for rotating the wheel around an axis arranged at a small angle to the carrier axis to carry the cutting edge in a plane inclined with respect to the path of the carrier, a housing pivoted on the carrier, a spindle carried by the housing and arranged to support the work piece radially of the wheel, gearing carried in the housing for rotating the spindle, and a driving member rotatable around the pivotal axis of the housing; substantially as described.

6. In a grinding machine, a ring shaped grinding wheel having an annular cutting edge, a carrier rotatable around an axis, means for rotating the wheel around an axis arranged at a small angle to the carrier axis to carry the cutting edge in a plane inclined with respect to the path of the carrier, a work supporting spindle mounted on the carrier, means for rotating the spindle to turn the work, and means for moving the spindle towards or from the annular cutting edge of the wheel for loading or unloading; substantially as described.

7. In a grinding machine, a driving spindle, a grinding wheel carried by the spindle and having an annular cutting edge, a carrier rotatable around the driving spindle, a work supporting spindle mounted on the carrier, the cutting edge of the wheel and the path of the work being arranged in planes making a small angle with one another to provide for a cutting feed, and means for rotating the work supporting spindle; substantially as described.

In testimony whereof I hereunto affix my signature.

JOHN A. DOANE.